United States Patent Office 2,897,218
Patented July 28, 1959

2,897,218

6-METHYL-1-DEHYDRO ANALOGUES OF CORTISONE, HYDROCORTISONE AND 21-ESTERS THEREOF

Oldrich K. Sebek and George B. Spero, Kalamazoo Township, Kalamazoo County, Mich., assignors to The Upjohn Company, Kalamazoo, Mich., a corporation of Michigan No Drawing. Application November 23, 1956
Serial No. 623,776

12 Claims. (Cl. 260—397.45)

The present invention relates to steroid compounds and is more particularly concerned with 1-dehydro-6-methylcortisone, 1-dehydro-6-methylhydrocortisone, the esters thereof and the process for the production therefor.

The present application is a continuation-in-part of applications Serial Number 580,143, filed April 23, 1956, now abandoned, and Serial Number 601,634, filed August 2, 1956, now abondoned.

The compounds and the process of the present invention are illustratively represented by the following sequence of formulae:

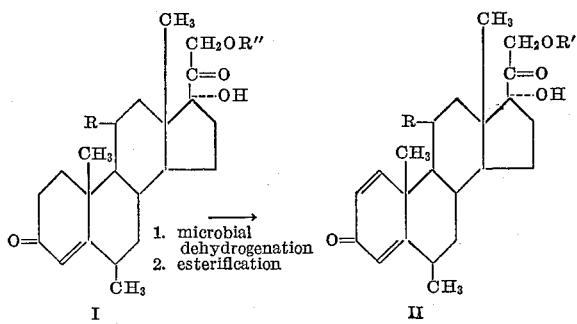

wherein R is selected from the group consisting of 11β-hydroxy and 11-keto, and R' and R" are selected from the group consisting of hydrogen and acyl, the acyl group being of an organic carboxylic acid, preferably a hydrocarbon carboxylic acid containing from one to twelve carbon atoms, inclusive.

The process of the present invention comprises: submitting an 11-oxygenated 6-methyl-17α,21-dihydroxy-4-pregnene-3,20-dione (the 6α or 6β-epimer) or an ester thereof (Formula I) to fermentation by a microorganism producing dehydrogenation in the 1-position of a 3-keto-4-pregnene to obtain the compound of Formula II. Especially useful for the dehydrogenation in the 1-position of steroid are the microorganisms selected from the genera consisting of Calonectria, Alternaria, Colletotrichum, Cylindrocarpon, Ophiobolus, Septomyxa, Didymella, Corynebacterium, Fusarium, Listeria, Erysipelothrix. Septomyxa, especially the species *Septomyxa affinis* ATCC 6737 and Corynebacterium, especially the species *Corynebacterium simplex* are preferred for the production of the corresponding 11-oxygenated 6-methyl-17α,21-dihydroxy-1,4-pregnadiene-3,20-dione.

Esterification of the thus produced 11-oxygenated 6-methyl - 17α,21 - dihydroxy-1,4-pregnadiene-3,20-dione is carried out by conventional methods such as admixing the selected 11-oxygenated 6-methyl-17α,21-dyhydroxy-1,4-pregnadiene-3,20-dione with an acylating agent such as a ketene, an isopropenyl acylate, an acid anhydride or acid halide of an organic carboxylic acid, preferably a hydrocarbon carboxylic acid containing from one to twelve carbon atoms, at temperatures between zero and 100 degrees, with room temperature preferred (cf. Examples 5 thru 8 and 11 thru 16).

The term 11-oxygenated here refers to the 11-hydroxy and 11-keto only.

It is an object of the instant invention to provide the 6-methyl-1-dehydro analogues of cortisone, hydrocortisone, and the 21-esters thereof and in particular the 6α-epimers thereof, i.e., 1-dehydro-6α-methylhydrocortisone and 1-dehydro-6α-methylcortisone. It is another object of the instant invention to provide a process for the production of 6-methyl-1-dehydrocortisone, -hydrocortisone, and the esters thereof. It is an additional object of the present invention to provide other 1-dehydro-6-alkyl or 1-dehydro-6-phenyl analogues of cortisone, hydrocortisone, and epi F compounds and esters thereof. Other objects of this invention will be apparent to those skilled in the art to which this invention pertains.

The new compounds, 1-dehydro-6-methylcortisone and 1-dehydro-6-methylhydrocortisone, especially in the form of 6α-epimers, are highly active adrenocortical hormones having greater glucocorticoid activity than hydrocortisone, cortisone, or the 1-dehydro analogues of hydrocortisone and cortisone as shown by the following table:

TABLE I

*Relative glucocorticoid activity of new steroids (compared to hydrocortisone 1)*

| Steroid | Glucocorticoid Activity | |
|---|---|---|
| | oral | subcutaneously |
| Hydrocortisone | 1 | 1 |
| 1-dehydrohydrocortisone | | 2.9 |
| 1-dehydro-6α-methylhydrocortisone | 18 | 10.6 |
| Cortisone | | 0.60 |
| 1-dehydrocortisone | | 3 |
| 1-dehydro-6α-methylcortisone | | 5.6 |

The new compounds 1-dehydro-6α-methylcortisone and 1-dehydro-6α-mthylhydrocortisone have the additional advantage of having low salt retention and high antiphlogistic activity which makes them valuable for systemic as well as topical use. The anti-phlogistic (anti-inflammatory) activity of 1-dehydro-6α-methylhydrocortisone as measured by the granuloma pouch test is six to seven times the anti-phlogistic activity of hydrocortisone. The 1-dehydro-6α-methyl epi F compound, 6α - methyl - 11α,17α,21 - trihydroxy - 1,4 - pregnadiene-3,20-dione, in addition to anti-inflammatory activity, is useful as an intermediate in the production of 6α-methyl-Δ¹-cortisone esters, for example, by the oxidation of 6-methyl epi F 21-acylates with chromic acid as shown in Example 10.

In general, compositions containing the compounds of the present invention can be prepared for animal or human use by incorporating them in any one of several dosage forms suitable for such use. Such dosage forms include the active ingredients plus a non-toxic carrier which can be either a solid material or a liquid. Bland carriers are of course much preferred for oral use. Examples of oral dosage forms are tablets, capsules, liquid suspensions or solutions. For the dosage forms which are particularly suitable for parenteral administration, a sterile diluent is, of course, necessary. When the active ingredients are to be used topically it can be prepared as an ointment, a bougie, a lotion or a jelly. When the intended use is the eye or ear, the compounds can be prepared in the form of drops or as an ointment. The compounds can also be prepared in an aerosol vehicle when the intended use is nasal. Examples of preferred dosage forms are as follows:

Tablet for oral use particularly for arthritis:

| | | |
|---|---|---|
| 1-dehydro-6α-methylhydrocortisone | milligrams | 5 |
| Lactose | grains | 3.3 |
| Sucrose | do | 0.04 |
| Starch | do | 0.075 |
| Calcium stearate | do | 0.02 |

Other dosages of the active ingredient, 1-dehydro-6-methylhydrocortisone can be used varying between 0.5 and ten milligrams per tablet. In addition other ingredients may be incorporated in the tablet such as antibiotics, e.g. tetracycline, chlortetracycline, chloramphenicol, penicillin, novobiocin, oxytetracycline, or the like, sulfa drugs, aspirin and/or vitamins.

An example for tablets for oral use containing aspirin is given below:

50,000 tablets containing aspirin and 1-dehydro-6-methylhydrocortisone as the essential active ingredients are prepared from the following types and amounts of ingredients:

Mixture.—Part I:
  Acetylsalicylic acid granular USP stand.
    No. 40 mesh _____ 33 lbs. 1 oz.

Mixture.—Part II:
  1-dehydro-6α-methylhydrocortisone _ 193 grs.
  Color _____ 1 lb. 6 oz. 375 grs.
  Bolted starch _____ 11 oz. 188 grs.
  Bolted talc _____ 1 lb. 6 oz. 375 grs.

For topical use, ointments are prepared illustratively as follows:

For the preparation of 500 pounds of an ointment, suitable for topical use, containing advantageously neomycin and 1-dehydro-6α-methylhydrocortisone as the essential active ingredients, the following types and amounts of ingredients are used:

| | |
|---|---|
| 4% multiwax No. W-445 [1] | 20 lbs. |
| 20% light mineral oil USP viscosity 180 | 100 lbs. |
| 0.5% cholesterol USP | 2 lbs. 8 oz. |
| 0.02% methylparaben USP | 1 oz. 263 grs. |
| 0.18% n-butyl-p-hydroxybenzoate | 14 oz. 175 grs. |
| 0.5% 1-dehydro-6α-methylhydrocortisone (micronized) | 2 lbs. 8 oz. |
| 0.6% neomycin sulfate (microatomized) | 3 lbs. |
| White petrolatum USP q.s.-ad | 500 lbs. |

[1] A microcrystalline wax of high melting point from L. Sonneborn and Sons, Inc., New York, N.Y.

Other antibiotics which may be used advantageously in place of or with neomycin include polymyxin B sulfate, bacitracin, gramicidin, tyrothricin. Actual potentiation of polymyxin and neomycin is obtained by the addition of 1-dehydro-6α-methylhydrocortisone.

Instead of 1-dehydro-6α-methylhydrocortisone 21-esters thereof, like the 21-acetate, propionate, butyrate, benzoate, phenylacetate, phenylpropionate, dineopentylacetate, tertiary butylacetate, trimethylacetate and other esters as shown in the examples may be used for parenteral administration. Furthermore the 1-dehydro-6α-methylcortisone may be substituted by 1-dehydro-6α-methylcortisone or 21-esters thereof such as mentioned before or by the 6β-methyl epimers, 1-dehydro-6β-methylhydrocortisone and 1-dehydro-6β-methylcortisone or 21-acylates thereof. For parenteral use the water-soluble esters of polybasic acids and their salts are particularly suitable such as the sodium, phenylephrine, N-methyl-glucamin salt of 1-dehydro-6α-methylhydrocortisone 21-hemisuccinate, dimethyl glutarate, glycolate, tartrate, or the like, in buffered solution. Also other 1-dehydro-6α-alkylhydrocortisones, 1-dehydro-6α-alkylcortisones and esters thereof as well as 1-dehydro-6α-arylhydrocortisones and 1-dehydro-6α-arylcortisone and esters of the 6β-epimers wherein the alkyl group is methyl, ethyl, propyl, butyl, pentyl, hexyl, or the like, and the aryl group is phenyl, benzyl or the like are useful in pharmaceutical compositions as above described.

In addition to using the 6β-methyl epimers, 1-dehydro-6β-methylhydrocortisone and 1-dehydro-6β-methylcortisone in equivalent quantities instead of the 6α-epimers, the 6β-epimers are easily converted to the more glucocorticoid-potent 6α-epimers as shown in Example 10.

The preparation of the above compositions is carried out in conventional manner known in the art.

The starting material for the instant invention are 11-oxygenated 6-methyl-17α,21-dihydroxy-4-pregnene-3,20-dione and the 21-esters thereof including both the 6α- and 6β-methyl epimers prepared as shown in detail in Preparations 1 through 10. In addition other 11-oxygenated 6-alkyl and 6-aryl, especially 6-phenyl-17α,21-dihydroxy-4-pregnene-3,20-diones and esters, can be used to prepare the corresponding 11-oxygenated 6-alkyl- or 6-aryl-17α,21-dihydroxy-1,4-pregnadiene-3,20-diones which also possess glucocorticoid and anti-inflammatory activity and can be substituted in anti-arthritic or anti-inflammatory therapy for 6α-methyl-11β,17α,21-trihydroxy-1,4-pregnadiene-3,20-dione or, respectively, 6α-methly-17α,21-dihydroxy-1,4-pregnadiene-3,11,20-trione.

The process of the instant invention consisting in fermentative dehydrogenation of the starting material is performed under conditions such as are described in detail in U.S. Patent 2,602,769, using a suitable nutrient containing assimilable carbon, nitrogen, sulfur, and phosphorus in suitable compound form as well as other compounds (vitamins, e.g., thiamine, thiamine-thiazole, plant hormones, e.g., auxins) and minerals (e.g., zinc, iron, cobalt, copper, potassium, manganese etc. in metabolically available form) necessary for the life-maintenance and growth of microorganisms. Air is allowed to enter the fermentation mixture by controlled aeration, by inclusion of air in shaken flasks or other suitable arrangement and the 6α-methylcortisone, 6α-methylhydrocortisone, or 6α-methyl epi F compound or esters thereof or the 6β-epimers thereof are added preferably, but not necessarily, in solution or suspension and after allowing time for the growth of the microorganism. It has been found that certain other steroids increase the yield of the present fermentation considerably and for optimum recovery steroidal promoters, selected from the group consisting of 3-ketobisnor-4-cholen-22-al, 3-ketobisnor-4-cholenic acid, crude 11β,21-dihydroxy-1,4,17(20)-pregnatrien-3-one and progesterone are added. Other compounds of steroidal and non-steroidal nature may also aid to increase the yield in the fermentation. Other details of the fermentation, recovery of the steroids and esterification are found in the examples.

The following examples are illustrative of the process and products of the present invention, but are not to be construed as limiting.

PREPARATION 1

5α,6α-oxido-11β,17α,21-trihydroxyallopregnane-3,20-dione 3,20-bis-(ethylene ketal)

To a solution of 0.901 gram of 11β,17α,21-trihydroxy-5-pregnene-3,20-dione 3,20-bis-(ethylene ketal) in eighteen milliliters of chloroform was added a solution of 331 milligrams of perbenzoic acid in 5.19 milliliters of chloroform. The resulting solution was allowed to stand in the refrigerator (ca. four degrees centigrade) for a period of 24 hours and thereupon at room temperature for an additional period of 72 hours. The reaction solution was then washed with five percent sodium bicarbonate solution and water, dried over anhydrous sodium sulfate and evaporated to dryness to give 1.031 grams of crude solid. Recrystallization from acetone gave 431 milligrams of material of melting point 230 to 247 degrees centigrade. The mother liquor, after evaporation to dryness, was dissolved in methylene chloride and chromatographed over 25 grams of acid washed alumina. The column was developed with three fractions each of methylene chloride plus 5, 10, 15, 20, 25 and 50 percent acetone, acetone, and acetone plus five percent methanol. The acetone plus five percent methanol eluate gave an additional 279 milligrams of the high melting product. The high melting material, 5α,6α-oxido-11β,17α,21-trihydroxyallopregnane-3,20-dione 3,20-bis-(ethylene ketal), was three times recrystallized from acetone and methanol to give a pure product of melting point 263 to 268 degrees centigrade. Other eluate fractions of lower melting point contained the 5β,6β-isomer thereof.

PREPARATION 2

*5α,6α-oxido-11α,17α,21-trihydroxyallopregnane-3,20-dione 3,20-bis-(ethylene ketal)*

In exactly the same manner as shown in Preparation 1, 11α,17α,21-trihydroxy-5-pregnene-3,20-dione 3,20-bis-(ethylene ketal) was epoxidized with perbenzoic acid in a chloroform reaction medium to yield a mixture of 5α,6α-oxido and 5β,6β-oxido-11α,17α,21-trihydroxypregnane-3,20-dione 3,20-bis-(ethylene ketal) which was separated by chromatography so as to isolate the desired 5α,6α-oxido-11α,17α,21-trihydroxyallopregnane-3,20-dione 3,20-bis-(ethylene ketal) from the 5β,6β-oxido isomer.

PREPARATION 3

*5α,6α-oxido-17α,21-dihydroxypregnane-3,11,20-trione 3,20-bis-(1,2-propylene ketal)*

To a solution of one gram of 17α,21-dihydroxy-5-pregnene-3,11-20-trione 3,20-bis-(1,2-propylene ketal) [cortisone 3,20-bis-(1,2-propylene ketal)] in chloroform was added a solution of perbenzoic acid in chloroform and the resulting solution allowed to stand in a refrigerator and then at room temperature, following the procedure of Preparation 1. The reaction solution was washed, dried, and evaporated as in Preparation 1. Recrystallization from acetone followed by fractionation of the mother liquor on a column of acid washed alumina, using the technique of Preparation 1 yielded 5α,6α-oxido-17α,21-dihydroxyallopregnane-3,11,20-trione 3,20-bis-(1,2-propylene ketal) and the 5β,6β-oxido isomer.

Using as starting material the more commonly available cortisone 3,20-bis-(ethylene ketal) gives the 5α,6α-oxido-17α,21-dihydroxyallopregnane-3,11,20-trione 3,20-bis-(ethylene ketal).

In the same manner as shown in Preparations 1 through 3, 5α,6α-oxido-11α,17α,21-trihydroxyallopregnane-3,20-dione 3,20-bis-(alkylene ketals), 5α,6α-oxido-11β,17α,21-trihydroxyallopregnane-3,20-dione 3,20-bis-(alkylene ketals) and 5α,6α-oxido-17α,21-dihydroxyallopregnane-3,11,20-trione 3,20-bis-(alkylene ketals) can be prepared by reacting the corresponding cortisone, hydrocortisone, and epi F diketals wherein the ketal group has been formed by reacting the steroid 3,20-dione with ethylene, propylene, 1,2-, 1,3-, or 2,3-butylene glycol or pentane, hexane, heptane, or octane-diols wherein the alcohol groups are in vicinal positions such as 1,2, 2,3, 3,4, or the like, or separated by one carbon atom such as 1,3, 2,4, 3,5, and the like, with an organic peracid such as performic, peracetic, perbenzoic, monoperphthalic acid, or the like. For the purpose of this invention, starting compounds having the ethylene ketal groups are preferred, since these ketals are generally more easily prepared in high yield than ketals produced by the reaction of the 3,20-diketo compounds with high alkanediols.

PREPARATION 4

*5α,11β,17α,21-tetrahydroxy-6β-methylallopregnane-3,20-dione 3,20-bis-(ethylene ketal)*

A solution of 1.115 grams of 5α,6α-oxido-11β,17α,21-trihydroxyallopregnane-3,20-dione 3,20-bis-(ethylene ketal) in 165 milliliters of tetrahydrofuran (the tetrahydrofuran being dried through distillation over lithium aluminum hydride) was added dropwise to a solution of 95 milliliters of methyl magnesium bromide in ether (the methyl magnesium bromide having a four molar concentration). To this mixture was added 575 milliliters of benzene and the reaction mixture was thereupon allowed to stir and reflux for 26 hours. After cooling, the reaction mixture was poured into 700 milliliters of iced, saturated ammonium chloride solution, stirred for a period of thirty minutes, and the benzene layer separated from the aqueous layer. The aqueous phase was extracted with three 200-milliliter portions of ethyl acetate and the extracts added to the benzene layer. The combined benzene-ethyl acetate solution was thereupon washed with water, dried over anhydrous sodium sulfate and evaporated to dryness to give 1.314 grams of crude solid. Trituration of this material with ether left 1.064 grams of crystalline product of melting point 221 to 230 degrees. Recrystallization of this material gave 5α,11β,17α,21-tetrahydroxy-6β-methylallopregnane-3,20-dione 3,20-bis-(ethylene ketal) of melting point 228 to 233 degrees and rotation [α]$_D$ minus eleven degrees in chloroform.

*Analysis.*—Calcd. for $C_{26}H_{42}O_8$: C, 64.70; H, 8.77. Found: C, 64.29; H, 8.69.

PREPARATION 5

*5α,11β,17α,21-tetrahydroxy-6β-ethylallopregnane-3,20-dione 3,20-bis-(ethylene ketal)*

In the same manner as shown in Preparation 4, 5α,6α-oxido-11β,17α,21-trihydroxyallopregnane-3,20-dione 3,20-bis-(ethylene ketal), was reacted with ethyl magnesium bromide in ether solution to give the corresponding 5α,11β,17α,21-tetrahydroxy-6β-ethylallopregnane-3,20-dione 3,20-bis-(ethylene ketal).

In the same manner as shown in Preparations 4 and 5, other 5α,11β,17α,21-tetrahydroxy-6β-alkylallopregnane-3,20-dione 3,20-bis-(ethylene ketals), 5α,11α,17α,21-tetrahydroxy-6β-alkylallopregnane-3,20-dione 3,20-bis-(ethylene ketals) and 5α,17α,21-trihydroxy-6β-alkylallopregnane-3,11,20-trione 3,20-bis-(ethylene ketals) are prepared by reacting the corresponding 5α,6α-oxido-17α,21-dihydroxyallopregnane-3,20-dione 3,20-bis-(ethylene ketal) oxygenated in the 11-position with a metal alkyl or metal aryl more specifically an alkyl metal halide such as a Grignard reagent, for example, methyl, ethyl, propyl, isopropyl, butyl, pentyl, hexyl, and phenyl magnesium bromides and iodides or cadmium alkyl and calcium alkyl and phenyl bromides or iodides. Representative 6β-alkylated allopregnanes thus prepared include: 5α,11β,17α,21-tetrahydroxy-6β-propylallopregnane-3,20-dione 3,20-bis-(ethylene ketal), 5α,11β,17α,21-tetrahydroxy-6β-butylallopregnane-3,20-dione 3,20-bis-(ethylene ketal), 5α,11β,17α,21-tetrahydroxy-6β-isobutylallopregnane-3,20-dione 3,20-bis-(ethylene ketal), 5α,11β,17α,21-tetrahydroxy-6β-pentylallopregnane-3,20-dione 3,20-bis-(ethylene ketal), 5α,11β,17α,21-tetrahydroxy-6β-hexylallopregnane-3,20-dione 3,20-bis-(ethylene ketal), 5α,11β,17α,21-tetrahydroxy-6β-phenylallopregnane-3,20-dione 3,20-bis-(ethylene ketal); 5α,11α,17α,21-tetrahydroxy-6β-methylallopregnane-3,20-dione 3,20-bis-(ethylene ketal); 5α,11α,17α,21-tetrahydroxy-6β-ethylallopregnane-3,20-dione 3,20-bis-(ethylene ketal); 5α,11α,17α,21-tetrahydroxy-6β-propylallopregnane-3,20-dione 3,20-bis-(ethylene ketal), 5α,11α,17α,21-tetrahydroxy-6β-isopropylallopregnane-3,20-dione 3,20-bis-(ethylene ketal), 5α,11α,17α,21-tetrahydroxy-6β-butylallopregnane-3,20-dione 3,20-bis-(ethylene ketal), 5α,11α,17α,21-tetrahydroxy-6β-pentylallopregnane-3,20-dione 3,20-bis-(ethylene ketal), 5α,11α,17α,21-tetrahydroxy-6β-hexylallopregnane-3,20-dione 3,20-bis-(ethylene ketal), 5α,11α,17α-21-tetrahydroxy-6β-phenylallopregnane-3,20-dione 3,20-bis-(ethylene ketal), the 21α-monoacylates and 11α,21-diacylates thereof wherein the acyl group is of an organic carboxylic acid and preferably of a hydrocarbon carboxylic acid containing from one to twelve carbon atoms, inclusive, or a benzene-sulfonic acid; 5α,17α,21-trihydroxy-6β-methyl-allopregnane-3,11,20-trione 3,20-bis-(ethylene ketal), 5α,17α-21 - trihydroxy - 6β - ethylallopregnane - 3,11,20-trione 3,20-bis-(ethylene ketal), 5α,17α,21-trihydroxy-6β-propylallopregnane - 3,11,20 - trione 3,20-bis-(ethylene ketal), 5α,17α,21 - trihydroxy-6β-isopropylallopregnane-3,11,20-trione 3,20-bis-(ethylene ketal), 5α,17α,21-trihydroxy-6β-butylallopregnane-3,11,20-trione 3,20-bis-(ethylene ketal), 5α,17α,21-trihydroxy-6β-pentylallopregnane-3,11,20-trione 3,20-bis-(ethylene ketal), 5α,17α,21-trihydroxy-6β-hexylallopregnane-3,11,20-trione 3,20-bis-(ethylene ketal), 5α,17α,21-trihydroxy-6β-phenylallopregnane-3,11,20-trione 3,20-bis-(ethylene ketal), and the like.

PREPARATION 6

5α,11β,17α,21-tetrahydroxy-6β-methylallopregnane-3,20-dione

A solution was prepared containing 468 milligrams of 5α,11β,17α,21 - tetrahydroxy-6β-methylallopregnane-3,20-dione 3,20-bis-(ethylene ketal), 38 milliliters of methanol and 7.7 milliliters of 2 N sulfuric acid. This solution was refluxed for a period of thirty minutes, then neutralized with five percent dilute sodium bicarbonate solution (about 100 milliliters) and concentrated under reduced pressure at 55 degrees centigrade to about 35 milliliters of volume. A product crystallized upon cooling and was recovered by filtration. This product was recrystallized from acetone Skellysolve B hexanes to give an analytical pure sample of 5α,11β,17α,21-tetrahydroxy-6β-methyl-allopregnane-3,20-dione of melting point 240 to 244 (decomposition) and rotation [α]$_D$ plus forty degrees in dioxane.

Analysis.—Calcd. for $C_{22}H_{34}O_6$: C, 66.98; H, 8.69. Found: C, 66.84; H, 8.86.

PREPARATION 7

5α,11β,17α,21-tetrahydroxy-6β-ethylallopregnane-3,20-dione

In the same manner as shown in Example 6, 5α,11β,17α,21 - tetrahydroxy - 6β - ethylallopregnane-3,20-dione 3,20-bis-(ethylene ketal) was hydrolyzed with dilute sulfuric acid in ethanol solution to give 5α,11β,17α,21-tetrahydroxy-6β-ethylallopregnane-3,20-dione.

In the same manner as shown in Preparations 6 and 7, inclusive, hydrolysis of the 6β-alkylallopregnane diketals, such as the 5α,11β,17α,21-tetrahydroxy-6β-methylallopregnane-3,20-dione 3,20-bis-(ethylene ketal), 5α,11α,17α,21 - tetrahydroxy - 6β - methylallopregnane-3,20-dione 3,20-bis-(ethylene ketals) and the 21-monoesters and 11α,21-diesters thereof, and 5α,17α,21-trihydroxy - 6β - alkylallopregnane - 3,11,20 - trione 3,20-bis-(ethylene ketal) as well as those 6β-alkylallopregnane-3,20-dione 3,20-bis-(ketals) wherein the ketal group is other than ethylene can be hydrolyzed to give the corresponding 5α,17α,21 - trihydroxy - 6β - alkylallopregnane-3,20-diones oxygenated in the 11-position, such as for example, 5α,11β,17α,21 - tetrahydroxy - 6β-propylallopregnane - 3,20 - dione, 5α,11β,17α,21 - tetrahydroxy - 6β - butylallopregnane - 3,20 - dione, 5α,11β,17α,21 - tetrahydroxy - 6β - isobutylallopregnane-3,20-dione, 5α,11β,17α,21 - tetrahydroxy - 6β - pentylallopregnane - 3,20 - dione, 5α,11β,17α,21 - tetrahydroxy-6β-hexylallopregnane - 3,20 - dione, 5α,11β,17α,21 - tetrahydroxy-6β-phenylallopregnane-3,20-dione, 5α,11α,17α,21-tetrahydroxy - 6β - methylallopregnane - 3,20 - dione, 5α,11α,17α,21-tetrahydroxy - 6β - ethylallopregnane - 3,20-dione, 5α,11α,17α,21-tetrahydroxy - 6β - propylallopregnane - 3,20 - dione, 5α,11α,17α,21 - tetrahydroxy - 6β - isopropylallopregnane - 3,20 - dione, 5α,11α,17α,21-tetrahydroxy - 6β - butylallopregnane - 3,20 - dione, 5α,11α,17α,21 - tetrahydroxy - 6β - pentylallopregnane - 3,20-dione, 5α,11α,17α,21 - tetrahydroxy - 6β - hexylallopregnane - 3,20 - dione, 5α,11α,17α,21-tetrahydroxy - 6β - phenylallopregnane - 3,20 - dione, 5α,17α,21-trihydroxy-6β-methylallopregnane - 3,11,20 - trione, 5α,17α,21 - trihydroxy - 6β - ethylallopregnane - 3,11,20 - trione, 5α,17α,21 - trihydroxy - 6β - propylallopregnane - 3,11,20-trione, 5α,17α,21 - trihydroxy - 6β - isopropylallopregnane-3,11,20-trione, 5α,17α,21-trihydroxy - 6β - butylallopregnane - 3,11,20 - trione, 5α,17α,21 - trihydroxy - 6β-pentylallopregnane - 3,11,20 - trione, 5α,17α,21 - trihydroxy - 6β - hexylallopregnane - 3,11,20 - trione, 5α,17α, 21 - trihydroxy - 6β - phenylallopregnane-3,11,20-trione, and the like, and including those 6β - alkylallopregnanes having ketal groups in positions 3 and 20 such as exemplified in Preparation 3.

PREPARATION 8

6α-methylhydrocortisone

A stream of nitrogen was bubbled through a solution of 429 milligrams of 5α,11β,17α,21-tetrahydroxy-6β-methylallopregnane - 3,20 - dione contained in 100 milliliters of denatured absolute alcohol for a period of ten minutes. To this solution was added 4.3 milliliters of 0.1 normal sodium hydroxide solution which had likewise been treated with nitrogen. The mixture was allowed to stand in a nitrogen atmosphere for a period of eighteen hours and thereupon acidified with acetic acid, and concentrated under reduced pressure at 55 degrees centigrade to dryness. The residue weighing 417 milligrams was recrystallized from acetone-Skellysoive B hexanes to give in two crops 249 milligrams of 6α-methylhydrocortisone melting between 184 and 194 degrees centigrade. An analytical sample was prepared melting at 203 to 208 degrees centigrade and consisting of 6α-methylhydrocortisone.

Analysis.—Calcd. for $C_{22}H_{32}O_5$: C, 70.18; H, 8.57. Found: C, 70.32; H, 8.50.

The mother liquors contained besides 6α-methylhydrocortisone, substantial amounts of 6β-methylhydrocortisone which can be isolated by recrystallization, papergram, countercurrent procedures and other means known in the art.

PREPARATION 9

6β-methylhydrocortisone

A solution was prepared containing 27.5 grams of 5α,11β,17α,21-tetrahydroxy - 6β - methylallopregnane-3,20 - dione in 6500 milliliters of ethanol denatured with methanol. The solution was freed of air oxygen by bubbling oxygen-free nitrogen through it for a period of fifteen minutes. To this solution was added a similarly air oxygen-free prepared solution of one-tenth normal sodium hydroxide (235 milliliters). The solution was allowed to stand at room temperature (about 22 to 24 degrees centigrade) in an inert nitrogen atmosphere for a period of twenty hours and was then acidified with fourteen milliliters of acetic acid. The thus obtained acid solution was evaporated at about fifty to sixty degrees centigrade in vacuo, the thus produced residue dissolved in 200 milliliters of ethyl acetate and 200 milliliters of water, the water layer separated from the organic layer and discarded, the organic layer washed with 350 milliliters of five percent aqueous sodium bicarbonate solution, then three times with water and thereupon dried over anhydrous sodium sulfate and concentrated to a volume of 180 milliliters. After cooling the 180 milliliters of solution in a refrigerator (about five degrees centigrade), the solution was filtered giving 11.9 grams of material. This material was redissolved in 500 milliliters of ethyl acetate, the ethyl acetate solution was concentrated to 150 milliliters, refrigerated as before to give 6.15 grams of crude 6β-methylhydrocortisone of melting point 220–223.

Recrystallization of the crude 6β-methylhydrocortisone three more times from ethyl acetate gave an analytical sample of 6β-methylhydrocortisone with melting point 223 to 227 degrees centigrade, rotation $[\alpha]_D$ plus 105 degrees in acetone; ultraviolet absorption $$\lambda_{max.}^{95\% \text{ ethanol}} \ 243 \ m\mu$$

$\alpha_M = 14,500$.

*Analysis.*—Calcd. for $C_{22}H_{32}O_5$: C, 70.17; H, 8.57. Found: C, 70.54; H, 8.91.

PREPARATION 10

6α-ethylhydrocortisone

In the same manner as shown in Preparation 8, 5α,11β,17α,21-tetrahydroxy - 6α - ethylallopregnane - 3,20-dione was treated with a solution of potassium hydroxide in methanol to give at room temperature 6α-ethylhydrocortisone of melting point 223–226 degrees centigrade and $$\lambda_{max.}^{EtOH} \ 243 \ m\mu$$

$\epsilon = 14,525$.

In the same manner dehydrating with an alkali metal hydroxide in alcoholic solution other 11-oxygenated-5α, 17α,21 - trihydroxy - 6β - alkylallopregnane - 3,20 - diones produced the corresponding 11-oxygenated - 6α - alkyl-17α,21 - dihydroxy - 4 - pregnene - 3,20 - diones such as 6α - propylhydrocortisone, 6α - butylhydrocortisone, 6α-isobutylhydrocortisone, 6α - pentylhydrocortisone, 6α-hexylhydrocortisone, 6α - phenylhydrocortisone, 6α-methylcortisone of melting point 212.5 to 215 degrees centigrade, 6α-ethylcortisone, 6α-propylcortisone, 6α - isoproplycortisone, 6α - butylcortisone, 6α - pentylcortisone, 6α - hexylcortisone, 6α - phenylcortisone, 11α,17α,21-trihydroxy - 6α - methyl - 4 - pregnene - 3,20 - dione, 11α,17α,21 - trihydroxy - 6α - propyl - 4 - pregnene - 3,20-dione, 11α,17α,21 - trihydroxy -6α - isopropyl - 4 - pregnene - 3,20 - dione, 11α,17α,21-trihydroxy - 6α - butyl-4-pregnene - 3,20 - dione, 11α,17α,21-trihydroxy - 6α-pentyl - 4 - pregnene - 3,20 - dione, 11α,17α,21-trihydroxy - 6α - hexyl - 4 - pregnene - 3,20 - dione, 11α,17α,21-trihydroxy - 6 - phenyl - 4 - pregnene - 3,20 - dione, and the like.

EXAMPLE 1

1-dehydro-6α-methylhydrocortisone (6α-methyl-11β,17α,21-trihydroxy-1,4-pregnadiene-3,20-dione)

Six 100-milliliter portions of a medium in 250-milliliter Erlenmeyer flasks containing one percent glucose, two percent corn steep liquor (60 percent solids) and tap water was adjusted to a pH of 4.9. This medium was sterilized for 45 minutes at fifteen pounds per square inch pressure and inoculated with a one to two day growth of *Septomyxa affinis* A.T.C.C. 6737. The Erlenmeyer flasks were shaken at room temperature at about 24 degrees centigrade for a period of three days. At the end of this period, this 600-milliliter volume was used as an inoculum for ten liters of the same glucose-corn steep liquor medium which in addition contained ten milliliters of an antifoam (a mixture of lard oil and octadecanol). The fermentor was placed into the water bath, adjusted to 28 degrees centigrade, and the contents stirred (300 r.p.m.) and aerated (0.5 l. air/10 l. beer). After 17 hours of incubation, when a good growth developed and the acidity rose to pH 6.7, two grams of 6α-methylhydrocortisone plus one gram of 3-ketobisnor-4-cholen-22-al, dissolved in 115 milliliters of dimethylformamide, was added and the incubation (conversion) carried out at the same temperature and aeration for 24 hours (final pH 7.9). The mycelium (56 grams dry weight) was filtered off and the steroidal material was extracted with methylene chloride, the methylene extracts evaporated to dryness, and the resulting residue chromatographed over a Florisil column. The column was packed with 200 grams of Florisil and was developed with five 400-milliliter fractions each of methylene chloride, Skellysolve B-acetone mixtures of 9:1, 8:2, 7:3, 1:1, and methanol. The fraction eluted with Skellysolve B-acetone (7:3) weighed 1.545 and on recrystallization from acetone gave, in three crops, 928 milligrams of product of melting point 210–235 degrees. The sample prepared for analysis melted at 245 to 247 degrees. Rotation $[\alpha]_D$ plus 83 degrees was in dioxane.

*Analysis.*—Calcd. for $C_{22}H_{30}O_5$: C, 70.56; H, 8.08. Found: C, 70.53; H, 7.94.

$$\lambda_{max.}^{EtOH} \ 243 \ m\mu$$

$\epsilon = 14,875$.

Infrared absorption in Nujol mineral oil suspension:

| | | | |
|---|---|---|---|
| OH cm.⁻¹ | 3,430 | 3,330 | 3,180 |
| 20-keto cm.⁻¹ | 1,706 | | |
| conjugated 3-keto cm.⁻¹ | 1,645 | | |
| $\Delta^{1,3}$-double bond cm.⁻¹ | 1,592 | | |

Instead of by fermentative dehydrogenation, 1-dehydro-6α-methylhydrocortisone or an ester thereof can be obtained by dehydrogenation of 6α-methylhydrocortisone or an ester thereof with selenium dioxide as illustrated in Example 1A.

EXAMPLE 1A

1-dehydro-6α-methylhydrocortisone acetate

A mixture of seventy milligrams of 6α-methylhydrocortisone acetate in 4.5 milliliters of tertiary butyl alcohol and 0.45 milliliter of acetic acid and 24-milligrams of selenium dioxide was heated to 75 degrees centigrade and stirred for 24 hours. Thereafter another 24-milligram portion of selenium dioxide was added and heated to 75 degrees centigrade and stirring continued. Thereafter the mixture was cooled, filtered to remove the selenium dioxide and evaporated. Paper chromatography showed the residue to contain about fifty to 55 percent of 1-dehydro-6α-methylhydrocortisone acetate which can be recovered from the residue by recrystallization and chromatography.

Infrared absorption in Nujol mineral oil suspension:

| | | | |
|---|---|---|---|
| OH cm.⁻¹ | 3,400 | 3,280 | |
| 11- and 20-keto cm.⁻¹ | 1,722 | 1,700 | |
| conjugated 3-keto cm.⁻¹ | 1,655 | | |
| $\Delta^{1,4}$-double bond cm.⁻¹ | 1,611 | 1,597 | |

EXAMPLE 2

1-dehydro-6β-methylcortisone

In the same manner given in Example 1, 6α-methylcortisone was submitted to fermentation by *Septomyxa affinis* in the same nutrient medium with crude 11β,21-dihydroxy-1,4,17(20)-pregnatrien-3-one as promoter to give 1-dehydro-6α-methylcortisone of melting point 230 to 232 degrees centigrade.

Instead of the 3-ketobisnor-4-cholen-22-al as promoter progesterone, 11β,21-dihydroxy-1,4,17(20) - pregnatrien-3-one or 3-ketobisnor-4-cholenic acid may be used.

EXAMPLE 3

6-methyl-11α,17β,21-trihydroxy-1,4-pregnadiene-3,20-dione (1-dehydro-6-methyl epi F)

In the same manner given in Example 1, 6-methyl-11α,17α,21 - trihydroxy-4-pregnene - 3,20 - dione was submitted to fermentation by *Septomyxa affinis* to give 6-methyl-11α,17α,21 - trihydroxy-1,4 - pregnadiene - 3,20-dione which was isolated.

Using 3-ketobisnor-4-cholenic acid in the above reaction or any of the other beforementioned steroidal promoters increases the yield in 6-methyl-11α,17α,21-trihydroxy-1,4-pregnadiene-3,20-dione.

EXAMPLE 4

1-dehydro-6β-methylhydrocortisone

In the same manner given in Example 1, fermenting with *Septomyxa affinis* in a nutrient medium with crude 11β,21-dihydroxy-4,17(20)-pregnadien-3-one as promoter 6β-methylhydrocortisone yielded 1-dehydro - 6β - methylcortisone.

EXAMPLE 5

*1-dehydro-6β-methylcortisone*

In the same manner given in Example 1, 6β-methylcortisone was submitted to fermentation by *Septomyxa affinis* in the same nutrient medium with crude 11β,21-dihydroxy-4,17(20)-pregnadien-3-one as promoters to give 1-dehydro-6β-methylcortisone.

Instead of the 11β,21-dihydroxy-4,17(20)-pregnadien-3-one as promoter progesterone, 3-ketobisnor-4-cholen-22-al or 3-ketobisnor-4-cholenic acid may be used.

EXAMPLE 6

In the same manner shown in Example 1, by fermentation with microorganisms of the genera Corynebacterium, Didymella, Calonectria, Alternaria, Colletotrichum, Cylindrocarpon, Ophiobolus, Septomyxa, Fusarium, Listeria or Erysipelothrix:

(a) 6-ethylhydrocortisone (6α- or 6β-epimer) yielded the corresponding 1-dehydro-6-ethylhydrocortisone.

(b) 6-propylhydrocortisone yielded 1-dehydro-6-propylhydrocortisone.

(c) 6-butylhydrocortisone yielded 1-dehydro-6-butylhydrocortisone.

(d) 6-hexylhydrocortisone yielded 1-dehydro-6-hexylhydrocortisone.

(e) 6-phenylhydrocortisone yielded 1-dehydro-6-phenylhydrocortisone.

(f) 6-ethylcortisone yielded 1-dehydro-6-ethylcortisone.

(g) 6-propylcortisone yielded 1-dehydro-6-propylcortisone.

(h) 6-valerylcortisone yielded 1-dehydro-6-valerylcortisone.

(i) 6-phenylcortisone yielded 1-dehydro-6-phenylcortisone.

(j) 6-ethyl-11α,17α,21-trihydroxy-4-pregnene-3,20-dione yielded 6-ethyl-11α,17α,21-trihydroxy-1,4-pregnadiene-3,20-dione.

(k) 6-butyl-11α,17α,21-trihydroxy-4-pregnene-3,20-dione yielded 6-butyl-11α,17α,21-trihydroxy-1,4-pregnadiene-3,20-dione.

(l) 6-phenyl-11α,17α,21-trihydroxy-4-pregnene-3,20-dione yielded 6-phenyl-11α,17α,21-trihydroxy-1,4-pregnadiene-3,20-dione.

In the same manner as shown in Examples 1 to 6, other 1-dehydro-6-alkyl and 1-dehydro-6-arylhydrocortisone, cortisone, epi F compounds (6α or 6β-epimers) are produced by subjecting the corresponding 6-alkylated or 6-arylated cortisone, hydrocortisone, and epi F compounds or the esters thereof to fermentation especially by *Corynebacterium simplex* or *Septomyxa affinis* in the absence or presence of steroidal promoters such as 3-ketobisnor-4-cholen-22-al, crude 11β,21-dihydroxy-1,4,17(20)-pregnatrien-3-one, 3-ketobisnor-4-cholenic acid and progesterone. Representative 1-dehydro-6α-alkyl and 1-dehydro-6α-aryl-11-oxygenated-17α,21-dihydroxy-1,4-pregnadiene-3,20-diones thus produced include: 1-dehydro-6α-valerylhydrocortisone, 1-dehydro-6α-hexylhydrocortisone, 1-dehydro-6α-isopropylcortisone, 1-dehydro-6α-isobutylhydrocortisone, 1-dehydro-6α-butylcortisone, 1-dehydro-6α-hexylcortisone, 1-dehydro-6α-isopropylhydrocortisone, 1-dehydro-6α-isopropylcortisone, 1-dehydro-6α-isobutylcortisone, 6α-isopropyl-11α,17α,21-trihydroxy-1,4-pregnadiene-3,20-dione, 6α-isobutyl-11α,17α,21-trihydroxy-1,4-pregnadiene-3,20-dione, 6α-pentyl-11α,17α,21-trihydroxy-1,4-pregnadiene-3,20-dione; 6α-hexyl-11α,17α,21-trihydroxy-1,4-pregnadiene-3,20-dione, and the like.

EXAMPLE 7

*1-dehydro-6α-methylhydrocortisone acetate*

A mixture was prepared containing 500 milligrams of 1-dehydro-6α-methylhydrocortisone in five milliliters of pyridine and five milliliters of acetic anhydride. The mixture was maintained at room temperature (22 to 24 degrees centigrade) for a period of six hours, thereupon poured into 100 milliliters of ice water and the resulting aqueous mixture extracted with three 25-milliliter portions of methylene chloride. The combined methylene chloride solutions were washed, dried over sodium sulfate and evaporated and the thus obtained residue recrystallized three times from acetone-Skellysolve B hexanes to give pure 1-dehydro-6α-methylhydrocortisone 21-acetate (6-methyl-11β,17α-dihydroxy-21-acetoxy-1,4-pregnadiene-3,20-dione).

EXAMPLE 8

*1-dehydro-6α-methylcortisone benzoate*

A mixture of 500 milligrams of 1-dehydro-6-methylcortisone, five milliliters of pyridine and five milliliters of benzoyl chloride was maintained at room temperature for a period of eight hours. Thereafter the mixture was poured into excess of water, the water extracts neutralized with sodium bicarbonate and thereupon the mixture refrigerated. The mixture was then filtered and the thus obtained 1-dehydro-6-methylcortisone benzoate recrystallized from methanol to give pure 1-dehydro-6α-methylcortisone benzoate (6α-methyl-17α-hydroxy-21-benzoyloxy-1,4-pregnadiene-3,11,20-trione).

EXAMPLE 9

*6α-methyl-11α,17α-dihydroxy-21-trimethylacetoxy-1,4-pregnadiene-3,20-dione*

A mixture of 500 milligrams of 6α-methyl-11α,17α,21-trihydroxy-1,4-pregnadiene-3,20-dione, five milliliters of pyridine and 0.5 milliliter of trimethylacetyl chloride was allowed to stand at room temperature for four hours. Thereafter the mixture was poured into excess of water and extracted with methylene chloride. The methylene extracts were washed with water, dried and evaporated and the thus obtained residue recrystallized from acetone Skellysolve B hexanes to give 6α-methyl-11α,17α-dihydroxy-21-trimethyl-acetoxy-1,4-pregnadiene-3,20-dione.

EXAMPLE 10

*6α-methyl-17α-hydroxy-11α,21-diacetoxy-1,4-pregnadiene-3,20-dione*

In the same manner as shown in Example 7, 6α-methyl-11α,17α,21-trihydroxy-1,4-pregnadiene-3,20-dione was acetylated with acetic anhydride in pyridine solution to give the diester, 6α-methyl-17α-hydroxy-11α,21-diacetoxy-1,4-pregnadiene-3,20-dione.

EXAMPLE 11

*1-dehydro-6-methylcortisone*

To 225 milligrams (0.6 millimole) of 1-dehydro-6α-methylhydrocortisone (6-methyl-11β,17α,21-trihydroxy-1,4-pregnadiene-3,20-dione) in nine milliliters of methanol was added 0.2 milliliter of pyridine, 0.4 milliliter of water and 166 milligrams of N-bromoacetamide (1.2 moles). The reaction mixture was held at room temperature overnight when titration of an aliquot indicated that approximately 1.43 mole equivalents of oxidant had been used. At this time 25 milliliters of a dilute solution of sodium sulfite was added to destroy excess N-bromoacetamide and the mixture was concentrated under reduced pressure until copious crystallization occurred. The mixture was cooled at zero degrees centigrade for thirty minutes and filtered to yield 155 milligrams of 1-dehydro-6α-methylcortisone of melting point 230–232 degrees centigrade.

EXAMPLE 12

*1-dehydro-6α-methylcortisone 21-trimethylacetate*

A mixture containing 6α-methyl-11α,17α-dihydroxy-21-trimethylacetoxy-1,4-pregnadiene-3,20-dione (200 milligrams), in two milliliters of acetic acid, two drops of water and fifty milligrams of chromic trioxide was allowed to stand at room temperature (about 24 degrees) for a period of three hours. Thereafter one milliliter of ethanol was added, the mixture shaken up and thereupon poured into fifty milliliters of ice water. The aqueous solution was then extracted with three 15-milliliter portions of methylene chloride, the methylene chloride extracts were combined, evaporated, and the residue recrystallized from methanol to give 1-dehydro-6α-methylcortisone 21-trimethylacetate (6α-methyl-17α-hydroxy-21-trimethylacetoxy-1,4-pregnadiene-3,11,20-trione).

Example 13

*1-dehydro-6α-methylhydrocortisone 21-hemisuccinate*

To a stirred solution of 2.5 grams of succinic anhydride in 25 milliliters of pyridine was added 2.0 grams of 1-dehydro-6-methylhydrocortisone. Stirring was continued until the 1-dehydro-6α-methylhydrocortisone was completely dissolved. After standing overnight the reaction mixture was slowly poured into a vigorously stirred mixture of thirty milliliters of concentrated hydrochloric acid, 102 milliliters of water and 127 grams of ice. Stirring was continued for one hour and the crude crystalline, 1 - dehydro - 6α - methylhydrocortisone 21 - hemisuccinate, was separated by filtration. The product was washed on the filter with water until the filtrate had a pH of 4.0, dried and recrystallized from 45 milliliters of methyl ethyl ketone and 36 milliliters of Skellysolve B hexanes to give pure 1-dehydro-6α-methylhydrocortisone 21-hemisuccinate.

Example 14

*1-dehydro-6α-methylhydrocortisone 21-hemisuccinate sodium salt*

Sodium hydroxide solution (0.1 normal) was slowly added to a stirred solution of two grams of 1-dehydro-6α-methylhydrocortisone 21-hemisuccinate in fifty milliliters of acetone until the pH rose to 7.4. During the addition of NaOH solution, 100 milliliters of water was also added.

The solution was concentrated at 25 degrees centigrade under vacuum to remove the acetone. The resulting aqueous solution of 1-dehydro-6α-methylhydrocortisone 21-hemisuccinate sodium salt was filtered and freeze-dried and recrystallized to give pure 1-dehydro-6α-methylhydrocortisone 21-hemisuccinate sodium salt.

Example 15

*1-dehydro-6α-methylhydrocortisone 21-(β,β-dimethylglutarate)*

To a solution of 260 milligrams of β,β-dimethylglutaric anhydride in two milliliters of pyridine was added 200 milligrams of 1-dehydro-6α-methylhydrocortisone. The mixture was stirred until the 1-dehydro-6α-methylhydrocortisone was completely dissolved and the flask was flushed with nitrogen. The mixture was allowed to stand overnight for eighteen hours and was then slowly poured into a stirred cold solution of 2.4 milliliters of concentrated hydrochloric acid and eighteen milliliters of water. The mixture was extracted with three five-milliliters portions of ethyl acetate, the ethyl acetate layer washed with dilute hydrochloric acid and water, dried over anhydrous magnesium sulfate and concentrated to 1.5 milliliters under reduced pressure. Thereto was added one milliliter of Skellysolve B hexanes and the mixture allowed to cool to zero degrees centigrade. After 24 hours the mixture was filtered to yield crystals of 1-dehydro-6-methylhydrocortisone 21-(β,β-dimethylglutarate). The infrared spectrum of 1-dehydro-6α-methylhydrocortisone 21-(β,β-dimethylglutarate), measured in Nujol mineral oil, corresponded to the postulated structure of the compound.

A metal salt of 1-dehydro-6α-methylhydrocortisone 21-(β,β-dimethylglutarate) may be prepared as illustrated below:

Example 16

*1-dehydro-6α-methylhydrocortisone 21-(β,β-dimethylglutarate) sodium salt*

A sodium hydroxide solution (0.1 normal) was slowly added to a stirred solution of two grams of 1-dehydro-6α-methylhydrocortisone 21-(β,β-dimethylglutarate) in 100 milliliters of acetone until the pH rose to 7.4. During the addition of the sodium hydroxide solution, 100 milliliters of water was also added.

The solution was concentrated at 25 degrees centigrade under vacuum to remove the acetone. The resulting aqueous solution was filtered and freeze dried to give 1-dehydro-6α-methylhydrocortisone 21-(β,β-dimethylglutarate) sodium salt.

Example 17

In the same manner as given in Example 7, treating in pyridine solution:

(a) 1 - dehydro - 6α - methylhydrocortisone with propionic anhydride yielded 1-dehydro-6a-methylhydrocortisone 21-propionate.

(b) 1-dehydro-6α-methylhydrocortisone with butyric anhydride yielded 1-dehydro-6α-methylhydrocortisone 21-butyrate.

(c) 1-dehydro-6α-methydhydrocortisone with valeric anhydride yielded 1-dehydro-6α-methylhydrocortisone 21-valerate.

(d) 1-dehydro-6α-methylhydrocortisone with hexanoyl bromide yielded 1-dehydro-6α-methylhydrocortisone 21-hexanoate.

(e) 1-dehydro-6α-methylhydrocortisone with heptanoyl bromide yielded 1-dehydro-6α-methylhydrocortisone 21-heptanoate.

(f) 1-dehydro-6α-methylhydrocortisone with octanoyl chloride yielded 1-dehydro-6α-methylhydrocortisone 21-octanoate.

(g) 1-dehydro-6α-methylhydrocortisone with benzoyl chloride yielded 1-dehydro-6α-methylhydrocortisone 21-benzoate.

(h) 1-dehydro-6α-methylhydrocortisone with phenylacetyl chloride yielded 1-dehydro-6α-methylhydrocortisone 21-phenylacetate.

(i) 1-dehydro-6α-methylhydrocortisone with β-cyclopentylpropionyl bromide yielded 1-dehydro-6α-methylhydrocortisone 21-(β-cyclopentylpropionate).

(j) 1-dehydro-6α-ethylhydrocortisone with acetic anhydride yielded 1-dehydro-6α-ethylhydrocortisone acetate.

(k) 1-dehydro-6α-propylhydrocortisone with acetic anhydride yielded 1-dehydro-6α-propylhydrocortisone acetate.

(l) 1-dehydro-6α-isopropylhydrocortisone with acetic anhydride yielded 1-dehydro-6α-isopropylhydrocortisone acetate.

(m) 1-dehydro-6α-butylhydrocortisone with acetic anhydride yielded 1-dehydro-6α-butylhydrocortisone acetate.

(n) 1-dehydro-6α-phenylhydrocortisone with acetic anhydride yielded 1-dehydro-6α-phenylhydrocortisone acetate.

(o) 1-dehydro-6α-methylcortisone with acetic anhydride yielded 1-dehydro-6α-methylcortisone 21-acetate.

(p) 1-dehydro-6α-methylcortisone with propionic anhydride yielded 1-dehydro-6α-methylcortisone 21-propionate.

(q) 1-dehydro-6α-methylcortisone with succinic anhydride yielded 1-dehydro-6α-methylcortisone 21-succinate.

(r) 1-dehydro-6α-methylcortisone with 2-furoyl chloride yielded 1-dehydro-6α-methylcortisone 21-(2-furoate).

(s) 1-dehydro-6α-methylcortisone with β,β-dimethylglutaric anhydride yielded 1-dehydro-6-methylcortisone 21-(β,β-dimethylglutarate).

(t) 1-dehydro-6α-phenylcortisone with acetic anhydride yielded 1-dehydro-6α-phenylcortisone 21-acetate.

(u) 1-dehydro-6α-ethylcortisone with butyric anhydride yielded 1-dehydro-6α-ethylcortisone 21-butyrate.

(v) 1-dehydro-6α-propylcortisone with hexanoyl chloride yielded 1-dehydro-6α-propylcortisone 21-hexanoate.

(w) 1-dehydro-6α-isopropylcortisone with benzoyl chloride yielded 1-dehydro-6α-isopropylcortisone 21-benzoate.

(x) 1-dehydro-6α-butylcortisone with toluenesulfonyl chloride yielded 1-dehydro-6α-butylcortisone 21-toluenesulfonate.

(y) 1-dehydro-6α-pentylcortisone with para-chlorobenzenesulfonyl chloride yielded 1-dehydro-6α-pentylcortisone 21-para-chlorobenzenesulfonate.

(z) 1-dehydro-6α-hexylcortisone with cinnamyl chloride yielded 1-dehydro-6α-hexylcortisone 21-cinnamate.

EXAMPLE 18

In the same manner as shown in Example 7, reacting in pyridine solution:

(a) 6α-methyl-11α,17α,21-trihydroxy-1,4 - pregnadiene-3,20-dione with triethylacetyl chloride in approximately equimolecular proportions yielded essentially the 6α-methyl-11α,17α-dihydroxy - 21 - triethylacetoxy - 1,4-pregnadiene-3,20-dione.

(b) 6α-methyl-11α,17α,21-trihydroxy-1,4 - pregnadiene-3,20-dione with dineopentylacetyl chloride in approximately equimolecular proportions yielded essentially the 6α-methyl-11α,17α-dihydroxy-21 - dineopentylacetoxy-1,4-pregnadiene-3,20-dione.

(c) 6α-ethyl-11α,17α,21-trihydroxy-1,4 - pregnadiene-3,20-dione with trimethylacetyl chloride in approximately equimolecular proportions yielded essentially the 6α-methyl-11α,17α-dihydroxy-21 - trimethylacetoxy-1,4-pregnadiene-3,20-dione.

(d) 6α-phenyl-11α,17α,21-trihydroxy - 1,4-pregnadiene-3,20-dione with trimethylacetyl chloride in approximately equimolecular proportions yielded essentially the 6α-phenyl-11α,17α-dihydroxy-21 - trimethylacetoxy-1,4-pregnadiene-3,20-dione.

The 1-dehydro-6α-alkyl-11-epi-hydrocortisone 21-esters can be oxidized with chromic acid as shown in Example 12, to give the corresponding 1-dehydro-6α-alkylcortisone 21-esters. Hydrolysis of 1-dehydro-6α-alkylcortisone 21-ester, dissolved in alcohol, with a base such as sodium or potassium hydroxide or carbonate, preferably in a nitrogen atmosphere gives the free 1-dehydro-6α-alkylcortisone.

EXAMPLE 19

*1-dehydro-6α-methylhydrocortisone from 1-dehydro-6β-methylhydrocortisone*

A solution was prepared containing one gram of crude 1-dehydro-6β-methylhydrocortisone (impurity 1-dehydro-6α-methylhydrocortisone) in 35 milliliters of methanol. To this solution was added five milliliters of 2-normal aqueous sulfuric acid solution. The reaction mixture was allowed to stand overnight (eighteen hours) at room temperature, thereupon neutralized with 25 milliliters of aqueous five percent sodium bicarbonate solution and then concentrated on the water bath at about fifty to 55 degrees centigrade to a volume of about twenty milliliters. The mixture was then filtered, and the thus recovered precipitate washed with thirty milliliters of water, and dried in a vacuum oven at 65 degrees centigrade to give a solid. The aqueous solution was extracted with three twenty-milliliter portions of ethyl acetate, the extracts were combined, washed with three twenty-milliliter portions of water, dried over anhydrous sodium sulfate, and evaporated under reduced pressure at 55 degrees centigrade to give a residue. This residue was combined with the solid, previously obtained, and recrystallized from ethyl acetate to give 1-dehydro-6α-methylhydrocortisone of about ninety percent purity.

Instead of a mineral acid such as sulfuric, hydrochloric, chloric, dilute nitric, perchloric acid or the like, a base, preferably an alkali metal hydroxide such as sodium or potassium hydroxide or carbonate, or other acidic or basic enolyzing agents capable to temporarily enolyze the 3-keto group to a 3-enol group can be used to epimerize the 1-dehydro-6β-methylhydrocortisone to the more stable 1-dehydro-6α-methylhydrocortisone. The conversion with a base can be carried out as follows:

One gram of 1-dehydro-6β-methylhydrocortisone, dissolved in forty milliliters of methanol, was treated at room temperature with 0.5 gram of sodium hydroxide, dissolved in three milliliters of water. The mixture was allowed to stand for sixteen hours overnight, was then diluted with 175 milliliters of water, neutralized with five percent aqueous hydrochloric acid, and extracted with three fifty-milliliter portions of methylene chloride. The methylene chloride extracts were repeatedly washed with water, dried over anhydrous sodium sulfate, evaporated and the thus obtained residue recrystallized from acetone to give 1-dehydro-6α-methylhydrocortisone.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound of the formula:

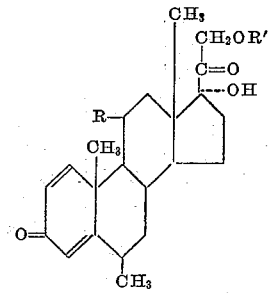

wherein R is selected from the group consisting of 11β-hydroxy and 11-keto, and wherein R' is selected from the group consisting of hydrogen and acyl, in which the acyl group is of a hydrocaron carboxylic acid containing from one to twelve carbon atoms, inclusive.

2. 1-dehydro-6-methylhydrocortisone.
3. 1-dehydro-6α-methylhydrocortisone.
4. 1-dehydro-6-methylcortisone.
5. 1-dehydro-6α-methylcortisone.
6. 1-dehydro-6-methylhydrocortisone 21-acetate.
7. 1-dehydro-6α-methylhydrocortisone 21-acetate.
8. 1-dehydro-6-methylcortisone 21-acetate.
9. 1-dehydro-6α-methylcortisone 21-acetate.
10. 1-dehydro-6-methylhydrocortisone 21 - hemisuccinate.
11. 1-dehydro-6α-methylhydrocortisone 21 - hemisuccinate.
12. 1-dehydro-6α-methylhydrocortisone 21 - hemisuccinate sodium salt.

References Cited in the file of this patent

UNITED STATES PATENTS

| | | |
|---|---|---|
| 2,736,734 | Sarett | Feb. 28, 1956 |
| 2,756,179 | Fried | July 24, 1956 |

UNITED STATES PATENT OFFICE
Certificate of Correction

Patent No. 2,897,218                                            July 28, 1959

Oldrich K. Sebek et al.

It is hereby certified that error appears in the printed specification of the above numbered patent requiring correction and that the said Letters Patent should read as corrected below.

Column 3, lines 59 and 60, for "-6α-methylcortisone" read — -6α-methylhydrocortisone—; column 10, lines 74 and 75, for "-6β-methylcortisone" read — -6β-methylhydrocortisone—.

Signed and sealed this 8th day of March 1960.

[SEAL]

Attest:
KARL H. AXLINE,
*Attesting Officer.*

ROBERT C. WATSON,
*Commissioner of Patents.*